US008224975B1

(12) United States Patent
Liu et al.

(10) Patent No.: US 8,224,975 B1
(45) Date of Patent: Jul. 17, 2012

(54) WEB SERVICE INITIATION PROTOCOL FOR MULTIMEDIA AND VOICE COMMUNICATION OVER INTERNET PROTOCOL

(75) Inventors: Feng Liu, Hillsborough, NJ (US); Wu Chou, Basking Ride, NJ (US); Li Li, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 832 days.

(21) Appl. No.: 11/748,245

(22) Filed: May 14, 2007

Related U.S. Application Data

(60) Provisional application No. 60/803,089, filed on May 24, 2006.

(51) Int. Cl.
*G06F 15/16* (2006.01)
(52) U.S. Cl. .......... 709/228; 709/217; 709/227
(58) Field of Classification Search .......... 709/201–203, 709/217–219, 227–229
See application file for complete search history.

(56) References Cited

U.S. PATENT DOCUMENTS

| 7,463,637 | B2 * | 12/2008 | Bou-Diab et al. | 709/229 |
|---|---|---|---|---|
| 2004/0186883 | A1 * | 9/2004 | Nyman et al. | 709/203 |
| 2005/0027871 | A1 * | 2/2005 | Bradley et al. | 709/227 |
| 2005/0273508 | A1 * | 12/2005 | Humpleman et al. | 709/223 |
| 2006/0101146 | A1 * | 5/2006 | Wang | 709/227 |
| 2006/0235978 | A1 * | 10/2006 | Bibr et al. | 709/227 |
| 2007/0022205 | A1 * | 1/2007 | Kim | 709/230 |
| 2007/0192465 | A1 * | 8/2007 | Modarressi | 709/223 |
| 2007/0244987 | A1 * | 10/2007 | Pedersen et al. | 709/217 |

OTHER PUBLICATIONS

Liu et al, WSIP- Service SIP Endpoint for Converged Multimedia/ Multimodal Communication over IP, 2004, ICWS'04.*
Pollman et al, "Web Services and Web Services Security Standards", 2005, Elsevier Ltd.*
Liu et al, "WIP: Web service Initiation Protocol of Multimedia and Voice Communication over IP", 2006, ICWS'06.*
Li et al, Two-Way Web Service: From Interface Design to Inerface Verification, 2005, ICWS'05.*
ECMA International, WS-Session- Web Services for Application Session Services, Standard ECMA-366, Jun. 2005, 1st Edition.*

* cited by examiner

*Primary Examiner* — Ian N Moore
*Assistant Examiner* — Jenee Alexander
(74) *Attorney, Agent, or Firm* — Chapin IP Law, LLC

(57) ABSTRACT

A method, system and computer program product for establishing communication services using web service operations over a network is presented. An application session can be established, extended and terminated between an event source and an event sink across the network by way of a session service. An addressing service on at least one of said event sink and said event source is used to address services. A multimedia communication services between the event source and the event sink is established by way of an eventing service.

24 Claims, 5 Drawing Sheets

WEB SERVICE INITIATION PROTOCOL FOR MULTIMEDIA AND VOICE COMMUNICATION OVER INTERNET PROTOCOL

CROSS REFERENCE TO RELATED APPLICATIONS

The present application claims the benefit of U.S. Provisional Patent Application No. 60/803,089, filed on May 24, 2006, which is incorporated herein by reference in its entirety.

BACKGROUND

Converged communication has been receiving increasing attentions because of its pervasive nature in person-to-person and business-to-business interactions. One critical issue in converged communication is the need of an open and service-oriented paradigm to enable converged communication services, including voice, video, and multimedia, so that communication can be service-oriented and ready to integrate into business transactions.

Service-oriented architecture (SOA) is a major advance in the industry that defines the use of a loosely coupled service description layer to decouple the service interface needed to enable applications from the physical implementation of these services. A key aspect of SOA is that services with their service-oriented interfaces can be accessed independently without knowledge of their underlying platform implementations. SOA defines a framework that allows services to be added, aggregated and re-used in a self-describing and service-oriented manner, so that they are ready to be called and composed in a standard way to perform their tasks, without the services having pre-knowledge of the calling applications, and without the application having or needing knowledge of how the services actually perform their tasks.

Web Service is a technology to enable service-oriented architecture. The service-oriented interfaces in Web Services are defined by the WSDL (Web Service Description Language) descriptions. Web Services are accessed through SOAP (Simple Object Access Protocol) message exchanges. SOAP and WSDL are standard based protocols and languages of W3C, upon which Web Services are defined. SOAP provides an XML-based, extensible message envelope format which can bind to various underlying transport protocols, e.g. HTTP, SMTP, JMS, TCP, etc. This makes Web Services not only loosely coupled with the physical platform implementations, e.g. operating systems, programming languages, etc., but also agnostic to transport protocols that can be used to transport service invocation messages. Therefore, same services can be made available for different platforms and environments. By enabling existing enterprise resources through Web Services, these enterprises can be expanded to provide services to a wider variety of clients. However, Web Services had been used for service integration and not been used as a protocol to establish communication between two endpoints for real-time voice, video, multimedia and converged communication services.

In the past, communication had been a tightly coupled nutshell wrapped by many layers of low-level protocols, and it is difficult to support new applications beyond the basic functions of a standalone device, e.g. telephone. Many protocols were designed based on a bottom-up process to satisfy a pre-defined set of functions which are often at low level and tightly coupled to a particular environment. Each individual protocol may define its own method of extensibility and service integration infrastructure, or decide to leave them open as vendor implementation dependent. This old paradigm is obviously not service oriented, and it has become a bottleneck to support service oriented and distributed communication.

SUMMARY

Service oriented communication is a major deficiency in existing communication mechanisms. For example, SIP (Session Initiation Protocol) of IETF is a strong candidate for multimedia and voice communication over Internet Protocol (IP). But SIP is neither based on eXtensible Markup Language (XML) nor service oriented. Extensibility for new services and interoperability between endpoints has become a major issue for SIP. XMPP (Extensible Messaging and Presence Protocol) is another IETF standard for near real-time communication. It is based on a streaming XML element model and not designed for real-time communication, e.g. voice, video, etc. Jingle Signaling is a recent effort of extending XMPP for real-time communication applications. It departs from the early dual-stack approach of XMPP combined with SIP that uses SIP for real-time communication. This is because it may not be feasible to implement SIP on all XMPP clients, and even it is feasible, maintaining and interworking with two signaling stacks is not desirable. But Jingle Signaling is based on the XMPP streaming XML element model and it is neither Web Services based nor service oriented. WSIP is a dual-stack approach of Web Services combined with SIP of using SIP for communication and Web Services for service integration. It is not based fully on Web Services and relies on non-Web Services and non-SOA based methods for communication establishment.

As illustrated above, despite the progress made in this area, existing prior approaches in communication are neither service-oriented nor based on full service-oriented protocols such as Web Services. In the era of Internet and collaborative computing, the service-oriented communication is critically desired but still yet to come.

The present invention in an illustrative embodiment meets the above-noted needs by providing a full-featured service oriented communication paradigm through Web Services Initiation Protocol (WIP), which utilizes a single stack of Web Services as communication protocols to establish multimedia and voice communication between endpoints and making (real-time) communication as services to realize distributed and service oriented communication over the network.

In accordance with one aspect of the invention, a communication system processing element comprises a processor coupled to a memory and implements an endpoint of the system. The endpoint includes a Web Services component. The Web Services component consists of a single stack of Web Services for communication with one or more endpoints.

In accordance with the invention, one aspect is the concept of Web Services based communication that includes the Web Services based endpoint (session) association establishment and the Web Services based media negotiation protocol. Thereby, the communication signaling can be entirely based on two-way Web Services interactions without using any non-Web Services or non-Service Oriented methods.

In accordance with one aspect of the invention, the Web Services based media negotiation for communication includes the concept of modeling media negotiation in communication as a special event-subscription in Web Services and modeling media stream as event in Web Services.

In accordance with one embodiment of the invention, the source of the media is modeled by an "event source" in Web Services, whose IP endpoint is specified by its event source endpoint reference (EPR), and the receiver of the media is modeled by an "event sink" in Web Services, whose IP endpoint is specified by its event sink EPR. Therefore, the media negotiation can be totally Web Services based through two-way Web Services interaction of finding the matching event (media) sink-source between two Web Services endpoints. This Web Services based media negotiation is generic and not tied to any particular media type or transmission methods, e.g. HTTP, JMS, TCP, etc.

In accordance with one embodiment of the invention, the Web Services component of the communication endpoint includes Web Services for application session establishment to establish association between two Web Services endpoints. The application session establishments Web Services are used as meta-services to provide a service-oriented extension framework to bundle base services and include new services in communication.

In accordance with one embodiment of the invention, the Web Services component of the WIP communication endpoint includes Web Services for event notifications to report state changes between two Web Services endpoints. The event notification Web Services are used to make the media negotiation process reliable and responsive for real-time communication.

In accordance with one aspect of the invention, WIP introduces a full Web Services based communication and specifies a stackable service oriented protocol framework. New services can be added following service oriented Web Services description based on WSDLs. They can be bundled with Web Services based application establishment meta-services and the generic Web Services event subscription based media negotiation.

In accordance with the invention, WIP can achieve end-to-end message level security for communication over IP by including WS-Security in its Web Services SOAP message exchange. This is in addition to conventional transport level security, e.g., TLS (Transport Layer Security), which can only secure the communication hop-by-hop, a deficiency in existing non-Web Services based communication mechanisms.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
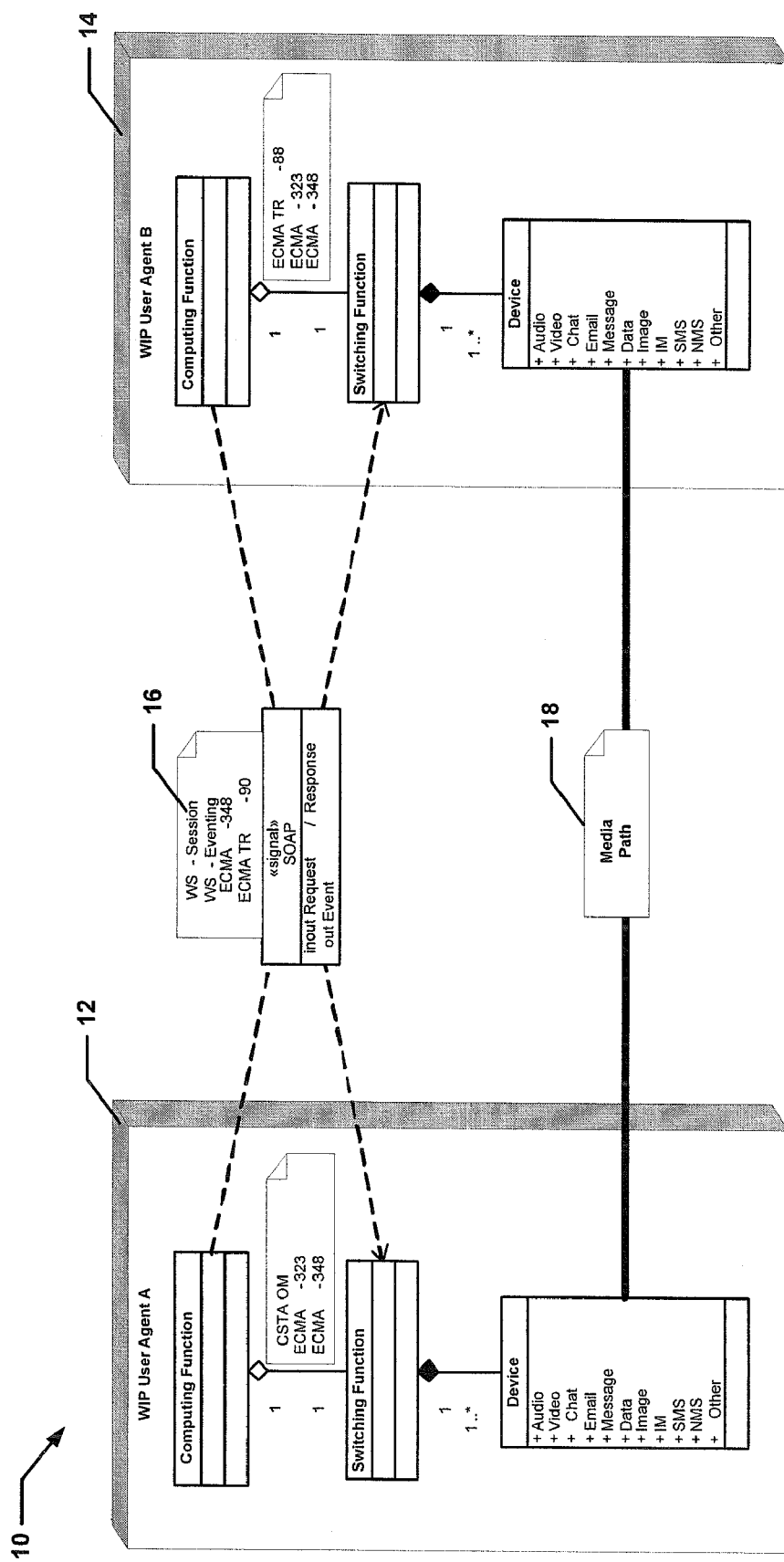
FIG. 1 depicts the block diagram of WIP user agent (UA) in peer-to-peer communication.

The Web Service Initiation Protocol (WIP) is based on several recent advances in web service technologies for communication. In particular, the generic web service session establishment protocol of WS-Session (ECMMA-366). WIP is a full-featured single-stack web service communication protocol, which is very different from other approaches. It is based on two-way, full duplex web service interaction for communication service establishment over IP. WIP does not depend on the lower level transport protocol to manage the session, nor rely on any implicit off-line agreement for session association. It is based on a generic Web service approach, WS-Session, for application session establishment, adopted as ISO (ISO/IEC 25437) and ECMA standards. WS-Session treats an application session as an independent service that can either work by its own or be integrated, composed, and stacked with other services. WS-Session separates the application session service management from the transport protocol and allows a client to establish explicit association and to create a session on the server through Web services.

WIP also provides two-way web service interaction. Endpoints in communication are typically both client and peer-to-peer server and communicate in two-way, full duplex fashion. Outbound (asynchronous) operations and event notifications are critical to Web service based communication enablement. However interface design is key to sustaining the two-way Web service interaction (extension from one-way request/response). The client interface needs to match the outbound operations of the server in a proper way to allow two-way web service interaction. This requires client to expose a proper event sink interface to receive the event pushed from the server.

WIP protocol stack is based on a novel use of WS-Session, WS-Addressing and WS-Eventing. In WIP, signaling for media negotiation and control is modeled by a special web service event subscription between event sink and event source. The receiver subscribes to receive the interested media from the source using the web service event subscription and delivery patterns to link the matching event sink with the event source and model the media delivery as a special form of event delivery. This distinctive approach of WIP solves the critical problem towards a full web service based signaling for media negotiation and control. Together with WS-Session, two-way web services, etc., a full web service and SOA based paradigm for communication over IP becomes possible.

WIP provides a full web service based communication protocol without dependency on non-web service methods for session establishment and signaling. WIP permits two-way web service based communication service enablement. It is highly extensible following a service-oriented design pattern and well suited for both direct peer-to-peer communication and for more sophisticated service extension and integration with switching environment/services, e.g. CSTA. WIP leads to a new class of SOA communication endpoints that enable voice and multimedia communication over IP as services. WIP is designed to be extensible with web service protocols to achieve end-to-end security and reliable messaging. As a full web service based communication paradigm, WIP is agnostic to the transport protocols. The communication services of WIP can be delivered through HTTP, JMS, etc., and can be easily integrated with business processes in a service-oriented fashion. The communication services on WIP are exposed as web services, ready to be reused, composed and integrated with other applications.

Unlike conventional one-way request/response based web services, two-way web service interaction is typically stateful. In telecommunication, the stateful transactions are usually based on a stateful context "Session". One of the reasons for a session is that a server needs to know certain client-specific information and context in order to carry out the interactions. In the situation of communication over TCP, a client needs to establish a TCP connection with the server before any message exchange starts. This connection (TCP/IP port) serves the purpose of identifying clients on the server as well as transmitting the events. The lifecycle of a session in this case is managed by the TCP/IP protocol.

However, web service is intended to be transport protocol neutral, and to achieve that it cannot rely on the lower-level transport protocol to manage the session. WS-Session (ECMA-366) provides an explicit and declarative specification of a set of web service operations that are needed to establish, extend and terminate an application session. It separates session management semantics from other operations, for example, event subscription. As a result, it enforces the rule that a client and a server can exchange messages if and only if a valid application context (session) is established. In terms of architecture design, WS-Session offers flexibility for the server to perform context-related tasks for service invocation, outbound operation and event notification. Table 1 lists operations in WS-Session WSDL. The application session establishment of WS-Session is entirely web service based through SOAP/WSDL, which are independent of the underlying transport protocol (e.g. JMS, HTTP, TCP, MQ, SIP, etc.).

WS-Addressing is an important web service standard for one-way service addressing. It specifies an extensible endpoint reference (EPR) structure that can address services on the web service endpoint with an enhanced resolution that is beyond the traditional URI or IP address. This property makes WS-Addressing well suited for web service based communication over IP, because today's Internet is inherently peer-to-peer and based on IPv4 with limited IPv4 addresses. From web service communication perspective, WS-Addressing specifies a message level service resource extension which does not require the physical migration to IPv6 addresses. Because of the extensibility of the EPR in WS-Addressing, web service endpoints can be uniquely identified through WS-Addressing EPR mechanism, and it alleviates the physical address resources of IPv4. It makes web service suitable for communication over IP, and the proposed approach of WIP fully leverages the enhanced service addressing capabilities of WS-Addressing.

Event notification is critical for communication services, and WS-Eventing specifies a lightweight web service eventing mechanism based on WS-Addressing. WIP involves the following web service constructs:

Event Source: A web service that generates events and accepts subscriptions.

Event Sink: A web service that receives event notification messages.

Subscriber: A web service that subscribes to event sources on behalf of the event sink, although they are usually identical.

Subscription Manager: A web service that manages the subscriptions, such as renewal, termination, pause and resume; and it can be the same web service as Event Source.

WS-Eventing is a generic web service protocol to establish the relation between event source and sink. It provides web service based event notification mechanism in WIP for communication over IP.

In order to construct a web service based communication protocol that is extensible and can be interoperable with enterprise communication service infrastructure, such as the switching environment of IP-PBX, the ECMA CSTA based call control modeling is applied to model the interaction patterns of WIP, and the web service call control operations defined in ECMA-348 which is the web service specification of CSTA III services are leveraged.

ECMA TR-90 describes the web service interaction patterns in the context of ECMA-348 which is consistent to the goal of a single-stack web service based communication protocol approach of WIP. WS-Addressing, WS-Eventing, and WS-Session are generic and standard based web service protocols, which are common in web service platforms and endpoints.

FIG. 1 depicts the block diagram 10 of WIP user agents (UAs) (also referred to as an endpoint, an event source or an event sink) in peer-to-peer communication. Also shown is the separation of the application session service management from the transport protocol. UA 12 (e.g., an event source) is in communication with UA 14 (e.g., an even sink). The application session service management 16 manages the session between UA 12 and UA 14, while the media path 18 handles the transport of data between the two UAs. Following CSTA call control model, each WIP UA is both a computing function (client) and a switching function (server). Two WIP UAs can establish multimedia and voice communication over IP using the web service initiation protocol of WIP.

Figure 2:
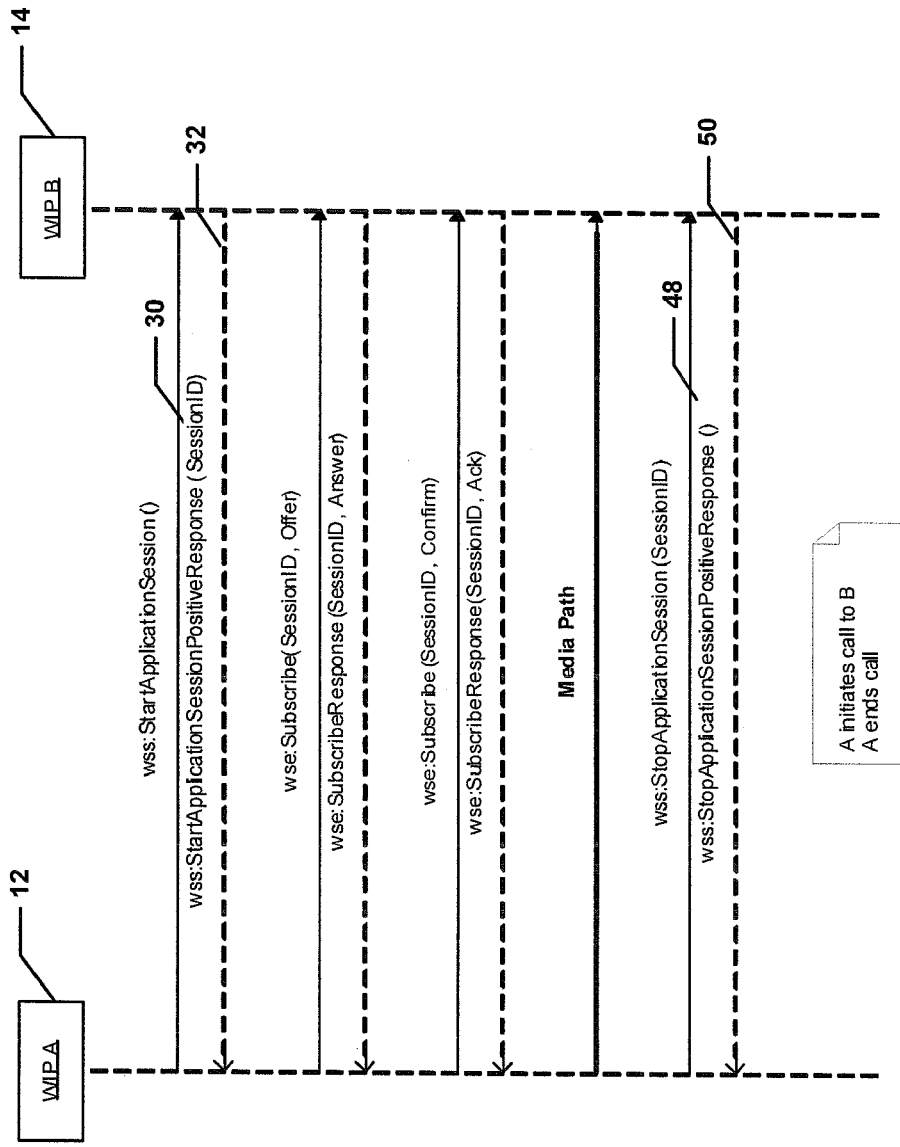
FIG. 2 comprises a diagram of a WIP call.

FIG. 2 illustrates the call flow and operations of WIP using WS-Session and WS-Eventing web service operations to establish P2P communication over IP. WIP is based on WS-Addressing for one-way service addressing for communication over IP, and it uses WS-Addressing <wsa:ReferenceParameters> to address the service endpoints. The session establishment in WIP is based on WS-Session and it uses <StartApplicationSession> operation 30 and 32 to establish an application session with the server. A sessionID is returned by the server in the positive response message 32. The sessionID is used in the subsequent service interaction to address the session as long as the session exists.

In WIP, an application session can be terminated by session duration timer or by stopApplicationSession operation 48 and 50. If the established session terminates, all subscribed services within the session will cease to exist.

A service requester can join the session and use the session context by including the sessionID in its service request SOAP message header section. From web service perspective, sessionID from WS-Session has a well-defined semantics in WS-Addressing framework as a special application dependent endpoint reference. This relationship is a very important feature in WIP.

The media transport negotiation in WIP is based on the two-way web service interaction paradigm. A key idea in WIP is to model media transmission relationship as a special "event" subscription in web services. The receiving port is modeled by an "event sink", whose IP endpoint is specified by its event sink EPR (endpoint reference) of WS-Addressing. Moreover, the source of the media is modeled by an "event source", whose IP endpoint is specified by its event source EPR. Therefore, the media transport negotiation in WIP becomes finding matching event (media) sink-source between two WIP endpoints for a selected media type which itself is also modeled as part of the EPR. Consequently, a successful event subscription will allow the source to send (transmit) the "event" (media) to the matching sink, and consequently, it establishes the media communication over IP.

This approach is pure web service based. It is declarative and extensible comparing to other approaches. In our embodiment of WIP, we made a novel use of WS-Eventing for media negotiation and transmission. SOAP messages are exchanged between two WIP endpoints, UA_A and UA_B, to establish session and media transmission. The session and media negotiation can be completed through only three web service interactions (see SOAP messages for details) as follows:

In performing Media negotiation (WS-Eventing), UA_A offers its event sink for intended (media) type of event source; and UA_B offers its event sink in its positive response to UA_A's subscription. In performing Media channel confirmation (WS-Eventing), UA_A subscribes the matching event sink pairs for selected two-way media transmission between UA_A and UA_B. UA_B confirms it with a positive response. The media negotiation in WIP leverages the web service fault message mechanism for signaling, which is declarative. For example, if UA_B cannot fulfill UA_A's subscription request with the requested event source (e.g. media type), it can terminate UA_A's subscription using the standard WS-Eventing fault message "EventSourceUnableToProcess". In addition, UA_A can declaratively terminate the on-going media transmission with UA_B by using <wse:Unsubscribe> operation.

Correspondingly, UA_B can declaratively terminate the on-going media transmission with UA_A by using <wse:SubscriptionEnd> operation. Finally, the entire communication session can be terminated from either side.

It should be noted that the WIP media negotiation and transmission over IP as web service event subscription can also be realized using other web service protocols, e.g. WS-Notification. However, modeling media negotiation and transmission as a special web service event subscription is very unique in WIP approach.

Moreover, the communication endpoint addressing capability of WIP is based on WS-Addressing and WS-Eventing, and it alleviates many limitations in today's IPv4 based Internet. The EPR specification of communication endpoint in WIP is fully extensible. When it comes to support multiple services between two WIP UAs, the EPR based endpoint addressing and event (media) subscription capabilities of WIP become advantageous.

WIP introduces a service-oriented (SOA) architecture in communication over IP by providing a full web service based communication paradigm. It can easily incorporate various WS standards to cover different needs for reliable and secure multimodal/multimedia applications over IP.

Figure 3A:
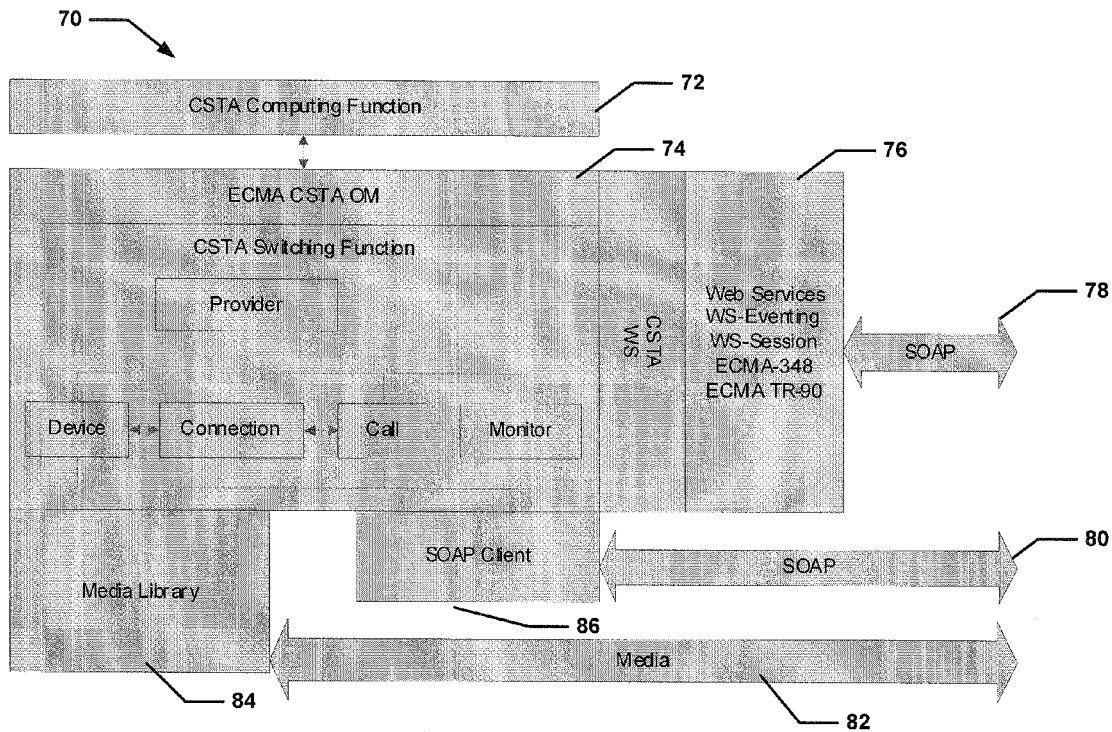
FIGS. 3A and 3B depict a block diagram of a WIP endpoint architecture.
Figure 3B:
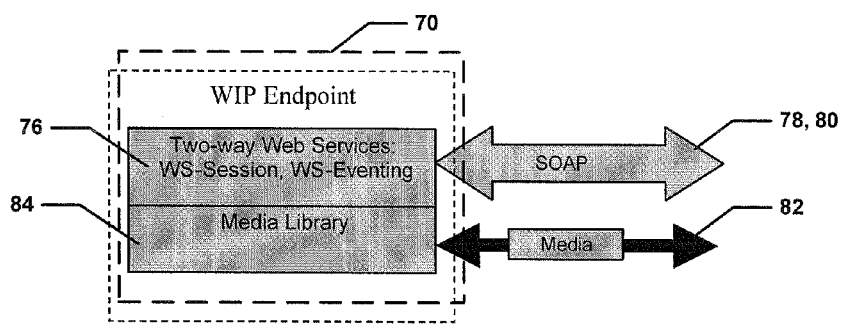

WIP can support the CSTA call control modeling. Referring now to FIG. 3, a block diagram of a WIP endpoint architecture 70 is shown. The WIP endpoint 70 includes a CSTA computing function 72 which is in communication with the ECMA CSTA OM 74 which includes the CSTA switching function and services. The Web Services 76 is also shown, and this uses SOAP 78 for managing the session service application. The Web service client 86 also uses SOAP 80 for communications. The Media Library 84 uses media transport 82 for transmitting data between one WIP endpoint and another WIP endpoint.

By supporting CSTA modeling, WIP provides the following advantages:

1. Extensible and possible to re-use or add standard CSTA web service operations.

2. Interoperable with CSTA based network switching environment and service patterns.

3. Ensure a smooth feature upgrade path for WIP leveraging CSTA services and modeling.

Although basic WIP operations for peer-to-peer communication can be very light weighted, involving only very few web service operations as illustrated in FIG. 2 of WIP call flow chart. However, the supporting of CSTA call control model in WIP allows new services from CSTA be added to the WIP UA in an interoperable and predictable manner. It also makes WIP easily interoperable with CSTA based switching environment. This upward capability differentiates WIP from a pure peer-to-peer web service protocol, making WIP well suited to work in large enterprise environment where new features and requirements can be added to WIP UA in a declarative fashion of web services. Moreover, it is noted that WIP is a full web service communication paradigm, the service-oriented extensible infrastructure of WIP allows it to support other call control models, in addition to and beyond CSTA call control model described here.

In multimedia and voice communication over IP, security of the service is a major concern. However, existing transport-level security solutions are limited to only hop-by-hop security. If intermediaries are involved when using a secure transport, the initial sender and the ultimate receiver need to trust those intermediaries to help provide end-to-end security, since each hop is secured separately. For communication over IP, point-to-point security, therefore, becomes insufficient, and end-to-end message level security is required, in particular, when intermediaries are not trusted by the communication endpoints. This problem in WIP can be addressed properly by incorporating WS-Security which can provide end-to-end message level security for communication over IP without resorting to non-interoperable ad-hoc solutions.

Figure 4A:
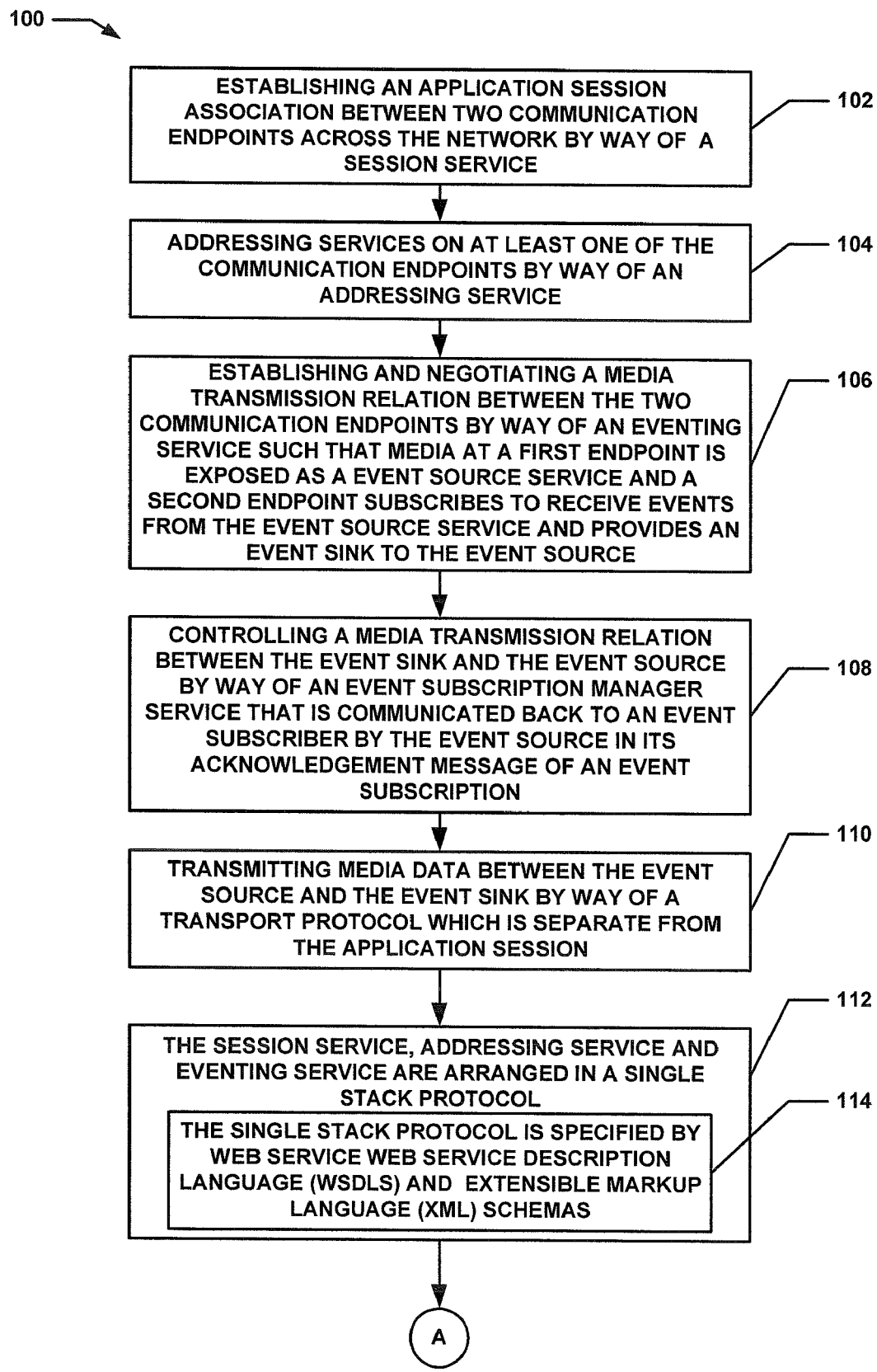
FIGS. 4A and 4B comprise a flow diagram of a particular embodiment of a method of establishing communication services using web service operations over a network.
Figure 4B:
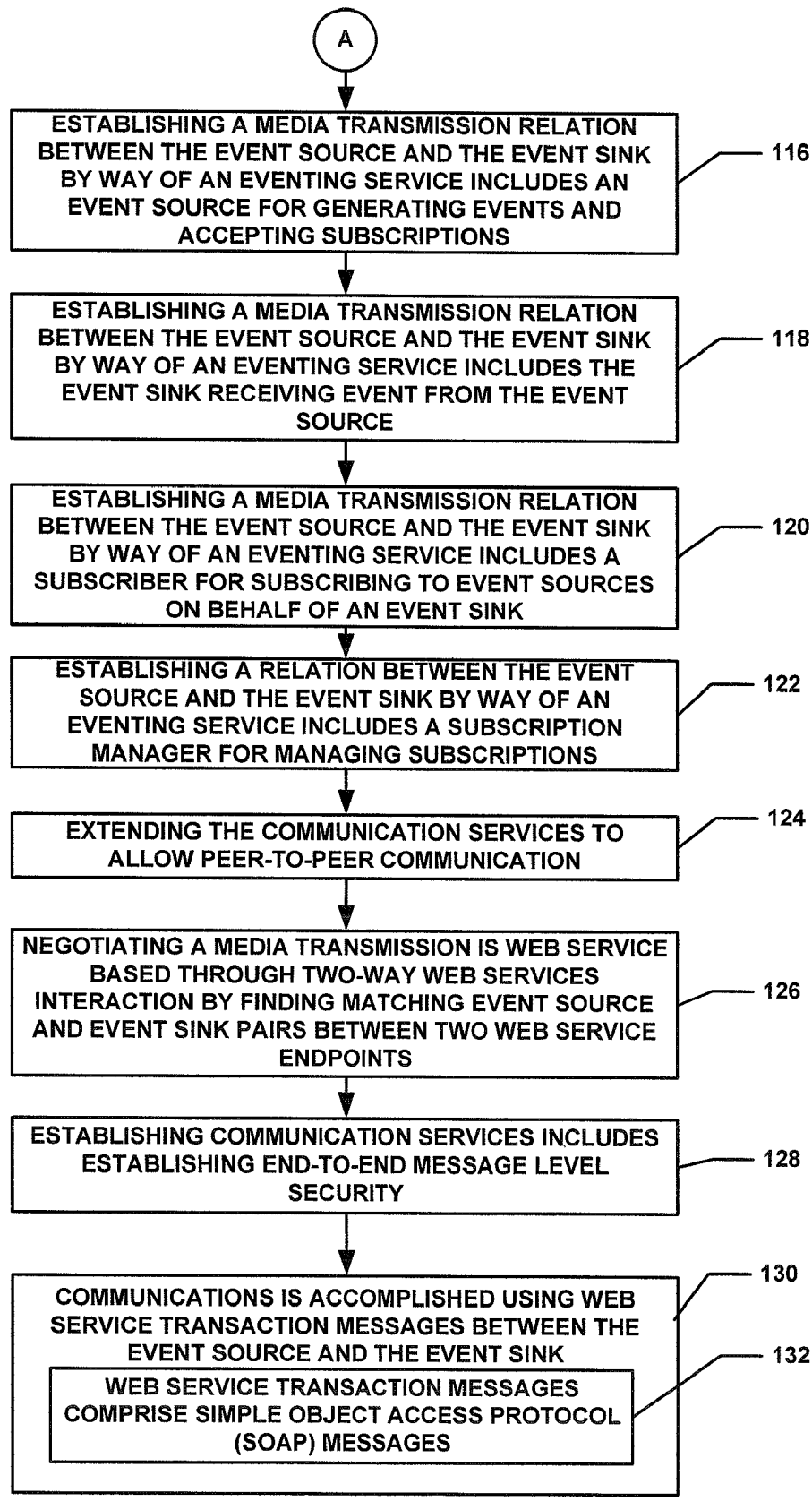

A flow chart of a particular embodiment of the presently disclosed method is depicted in FIGS. 4A and 4B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information that one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, a method 100 of establishing communication services using web service operations over a network is shown. The method begins with processing block 102 which discloses establishing an application session association between two communication endpoints across the network by way of a session service.

Processing block 104 states addressing services on at least one of the communication endpoints by way of an addressing service. Processing block 106 recites establishing and negotiating a media transmission relation between the two communication endpoints by way of an eventing service such that media at a first endpoint is exposed as a event source service and a second endpoint subscribes to receive events from the event source service and provides an event sink to the event source;

Processing block 108 discloses controlling a media transmission relation between the event sink and the event source by way of an event subscription manager service that is communicated back to an event subscriber by the event source in its acknowledgement message of an event subscription. This is followed by processing block 110 which states transmitting media data between the event source and the event sink by way of a transport protocol which is separate from the application session.

Processing block 112 discloses wherein the session service, addressing service and eventing service are arranged in a single stack protocol. This may include, as shown in processing block 114, the single stack protocol is specified by web service Web Service Description Language (WSDLs) and eXtensible Markup Language (XML) schemas.

Processing block 116 states the establishing a media transmission relation between the event source and the event sink by way of an eventing service includes an event source for generating events and accepting subscriptions. Processing block 118 discloses establishing a media transmission relation between the event source and the event sink by way of an eventing service includes the event sink receiving event from the event source.

Processing block 120 states the establishing a media transmission relation between the event source and the event sink by way of an eventing service includes a subscriber for subscribing to event sources on behalf of an event sink. Processing block 122 recites establishing a relation between the event source and the event sink by way of an eventing service includes a subscription manager for managing subscriptions.

Processing continues with processing block 124 which discloses extending the communication services to allow peer-to-peer communication. Processing block 126 states negotiating a media transmission is Web Service based through two-way Web Services interaction by finding matching event source and event sink pairs between two web service endpoints.

Processing block 128 discloses the establishing communication services include establishing end-to-end message level security. Processing block 130 states the communications is accomplished using web service transaction messages between the event source and the event sink. As shown in processing block 132 the web service transaction messages comprise Simple Object Access Protocol (SOAP) messages.

The present invention provides several advantages. With respect to end-to-end message level security over IP, WIP can achieve end-to-end message level security over IP though WS-security, which is open standard based and interoperable. By contrast, transport layer security (e.g. TLS, SSL, etc.) is only hop-by-hop and cannot extend over unfriendly intermediate proxy, a major security issue for VoIP. Another advantage has to do with WIP endpoint being a stackable and extensible SOA service endpoint. It can dynamically add and reassemble new services on WIP endpoint in an interoperable and declarative SOA fashion. It is service grid ready for scalable solutions (e.g. a stackable framework to add/assemble services from simple P2P to support switching, CSTA services, etc., which is declarative without ad-hoc or private structural change to WIP protocol.)

WIP provides a full web service based service-oriented communication paradigm to enable multimedia and voice communication over IP which is not limited by media types and whose communication signaling is agnostic to lower level transport protocols and can go over multiple transports, e.g. HTTP, JMS, SMTP, TCP, etc.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A method of establishing communication services using web service operations over a network comprising:
    establishing an application session association between two communication endpoints across the network by way of a session service, and wherein said application session includes web services which are used as meta-services to provide a service oriented extension framework to bundle base services and include new services in communications;
    addressing services on at least one of said communication endpoints by way of an addressing service;
    establishing and negotiating a media transmission relation between the two communication endpoints by way of an eventing service such that media at a first endpoint is exposed as a event source service and a second endpoint subscribes to receive events from said event source service and provides an event sink to said event source, wherein said session service, addressing service and eventing service are arranged in a single stack protocol, wherein said single stack protocol is specified by web service Web Service Description Language (WSDLs) and eXtensible Markup Language (XML) schemas;
    controlling a media transmission relation between the event sink and the event source by way of an event subscription manager service that is communicated back to an event subscriber by the event source in its acknowledgement message of an event subscription; and
    transmitting media data between the event source and the event sink by way of a transport protocol which is separate from said application session, and wherein communications signaling is entirely based on two-way web services interactions.

2. The method of claim 1 wherein said establishing a media transmission relation between the event source and the event sink by way of an eventing service includes an event source for generating events and accepting subscriptions.

3. The method of claim 1 wherein said establishing a media transmission relation between the event source and the event sink by way of an eventing service includes the event sink receiving event from the event source.

4. The method of claim 1 wherein said establishing a media transmission relation between the event source and the event sink by way of an eventing service includes a subscriber for subscribing to event sources on behalf of an event sink.

5. The method of claim 1 wherein said establishing a relation between the event source and the event sink by way of an eventing service includes a subscription manager for managing subscriptions.

6. The method of claim 1 further comprising extending said communication services to allow peer-to-peer communication.

7. The method of claim 1 wherein said negotiating a media transmission is Web Service based through two-way Web Services interaction by finding matching event source and event sink pairs between two web service endpoints.

8. The method of claim 1 wherein said establishing communication services includes establishing end-to-end message level security.

9. The method of claim 1 wherein said communications is accomplished using web service transaction messages between said event source and said event sink.

10. The method of claim 1 wherein media negotiation is totally Web Services based through two-way Web Services interaction of finding matching event sink-source between two Web Services endpoints, and wherein application session established Web Services are used as meta-services to provide a service oriented extension framework to bundle base services and include new services in communication.

11. The method of claim 1 wherein Web Services is used as a transport protocol to establish communications between said first endpoint and said second endpoint for real-time voice, video, multimedia and converged communication.

12. A non-transitory computer readable storage medium having computer readable code thereon for establishing communication services using web service operations over a network, the medium comprising:
  instructions for establishing an application session association between two communication endpoints across the network by way of a session service, and wherein said application session includes web services which are used as meta-services to provide a service oriented extension framework to bundle base services and include new services in communications;
  instructions for addressing services on at least one of said communication endpoints by way of an addressing service, wherein said session service, addressing service and eventing service are arranged in a single stack protocol, wherein said single stack protocol is specified by web service Web Service Description Language (WSDLs) and eXtensible Markup Language (XML) schemas;
  instructions for establishing and negotiating a media transmission relation between the two communication endpoints by way of an eventing service such that media at a first endpoint is exposed as a event source service and a second endpoint subscribes to receive events from said event source service and provides an event sink to said event source;
  instructions for controlling a media transmission relation between the event sink and the event source by way of an event subscription manager service that is communicated back to an event subscriber by the event source in its acknowledgement message of an event subscription; and
  instructions for transmitting media data between the event source and the event sink by way of a transport protocol which is separate from said application session, and wherein communications signaling is entirely based on two-way web services interactions.

13. The computer readable medium of claim 12 wherein said instructions for establishing a media transmission relation between the event source and the event sink by way of an eventing service includes instructions for an event source for generating events and accepting subscriptions.

14. The computer readable medium of claim 12 wherein said instructions for establishing a media transmission relation between the event source and the event sink by way of an eventing service includes instructions for the event sink receiving event from the event source.

15. The computer readable medium of claim 12 wherein said instructions for establishing a media transmission relation between the event source and the event sink by way of an eventing service includes instructions for a subscriber for subscribing to event sources on behalf of an event sink.

16. The computer readable medium of claim 12 wherein said instructions for establishing a relation between the event source and the event sink by way of an eventing service includes instructions for a subscription manager for managing subscriptions.

17. The computer readable medium of claim 12 further comprising instructions for extending said communication services to allow peer-to-peer communication.

18. The computer readable medium of claim 12 wherein said instructions for negotiating a media transmission is Web Service based through two-way Web Services interaction by finding matching event source and event sink pairs between two web service endpoints.

19. The computer readable medium of claim 12 wherein said instructions for establishing communication services includes instructions for establishing end-to-end message level security.

20. The computer readable medium of claim 12 further comprising instructions wherein said communications is accomplished using web service transaction messages between said event source and said event sink.

21. The computer readable medium of claim 12 further comprising instructions wherein media negotiation is totally Web Services based through two-way Web Services interaction of finding matching event sink-source between two Web Services endpoints, and wherein application session established Web Services are used as meta-services to provide a service oriented extension framework to bundle base services and include new services in communication.

22. The computer readable storage medium of claim 12 further comprising instructions wherein Web Services is used as a transport protocol to establish communications between said first endpoint and said second endpoint for real-time voice, video, multimedia and converged communication.

23. An endpoint comprising:
  a memory;
  a processor;
  a communications interface;
  an interconnection mechanism coupling the memory, the processor and the communications interface; and
  wherein the memory is encoded with an application that when performed on the processor, provides a process for processing information, the process causing the computer system to perform the operations of:
    establishing an application session association with another endpoint across the network by way of a session service, and wherein said application session includes web services which are used as meta-services to provide a service oriented extension framework to bundle base services and include new services in communications;
    addressing services by way of an addressing service;
    establishing and negotiating a media transmission relation with another endpoint by way of an eventing service such that media at the endpoint is exposed as an event source service and wherein a second endpoint subscribes to receive events from said event source service and provides an event sink to said event source, wherein said session service, addressing service and eventing service are arranged in a single stack protocol, wherein said single stack protocol is specified by web service Web Service Description Language (WSDLs) and eXtensible Markup Language (XML) schemas;

controlling a media transmission relation between the event sink and the event source by way of an event subscription manager service that is communicated back to an event subscriber by the event source in its acknowledgement message of an event subscription; and transmitting media data between the event source and the event sink by way of a transport protocol which is separate from said application session, and wherein communications signaling is entirely based on two-way web services interactions.

24. The endpoint of claim 23 wherein media negotiation is totally Web Services based through two-way Web Services interaction of finding matching event sink-source between two Web Services endpoints, and wherein application session established Web Services are used as meta-services to provide a service oriented extension framework to bundle base services and include new services in communication.

* * * * *